(12) United States Patent
Acuña-Rohter et al.

(10) Patent No.: US 10,032,219 B2
(45) Date of Patent: Jul. 24, 2018

(54) SECURE EXCHANGE FEED MARKET DATA EMBARGO

(71) Applicant: Chicago Mercantile Exchange Inc., Chicago, IL (US)

(72) Inventors: José Antonio Acuña-Rohter, Chicago, IL (US); Paul Callaway, Chicago, IL (US); Pearce Peck-Walden, Chicago, IL (US); Barry Galster, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 1065 days.

(21) Appl. No.: 14/034,742

(22) Filed: Sep. 24, 2013

(65) Prior Publication Data

US 2015/0088720 A1 Mar. 26, 2015

(51) Int. Cl.
| G06Q 40/04 | (2012.01) |
| G06F 21/10 | (2013.01) |
| G06F 21/62 | (2013.01) |
| H04L 29/06 | (2006.01) |
| H04L 9/14 | (2006.01) |

(52) U.S. Cl.
CPC ............ *G06Q 40/04* (2013.01); *G06F 21/10* (2013.01); *G06F 21/6254* (2013.01); *H04L 9/14* (2013.01); *H04L 63/04* (2013.01); *H04L 63/062* (2013.01); *H04L 2209/56* (2013.01)

(58) Field of Classification Search
CPC .................................................. G06Q 40/04
See application file for complete search history.

(56) References Cited

U.S. PATENT DOCUMENTS

| 5,802,499 A * | 9/1998 | Sampson ............... G06Q 40/02 705/35 |
| 6,850,907 B2 * | 2/2005 | Lutnick .................. G06Q 40/04 705/37 |
| 7,389,422 B2 | 6/2008 | Banerjee et al. |
| 7,426,721 B1 | 9/2008 | Saulpaugh et al. |

(Continued)

FOREIGN PATENT DOCUMENTS

| EP | 1225717 A2 | 7/2002 |
| EP | 2851862 A1 | 3/2015 |

OTHER PUBLICATIONS

Extended Search Report from EP Application No. 14186095.7, dated Jan. 29, 2015, EP.

(Continued)

*Primary Examiner* — Bruce I Ebersman
(74) *Attorney, Agent, or Firm* — Lempia Summerfield Katz LLC

(57) ABSTRACT

Methods, devices, and systems for communicating market data with market participants involve obfuscating at least a portion of a first financial message. Communicating the market data also involves augmenting a second financial message with a key configured to remove the obfuscation from the obfuscated portion of the first financial message. The market data is ultimately communicated by transmitting the first financial message to a particular participant, and transmitting the second message to a plurality of participants. The particular participant may then use the key from the second financial message to remove the obfuscation of the first financial message.

19 Claims, 7 Drawing Sheets

(56) References Cited

U.S. PATENT DOCUMENTS

| | | | |
|---|---|---|---|
| 8,184,805 B2 | 5/2012 | Yokota et al. | |
| 2002/0097878 A1 | 7/2002 | Ito et al. | |
| 2008/0005571 A1* | 1/2008 | Moskowitz | G06Q 30/0601 |
| | | | 713/176 |
| 2011/0071958 A1 | 3/2011 | Grody et al. | |
| 2012/0221462 A1 | 8/2012 | De Verdier | |
| 2012/0246055 A1 | 9/2012 | Schlifstein et al. | |
| 2012/0250865 A1 | 10/2012 | Terpstra et al. | |
| 2013/0218739 A1 | 8/2013 | Kmiec et al. | |
| 2014/0143121 A1* | 5/2014 | Stevens | G06Q 40/04 |
| | | | 705/37 |
| 2015/0088723 A1 | 3/2015 | Acuna-Rohter et al. | |

OTHER PUBLICATIONS

International Search Report and Written Opinion from PCT/US13/25665 dated Mar. 14, 2013.
U.S. Appl. No. 13/399,364.
International Search Report and Written Opinion, from PCT/US2014/068710, dated Mar. 12, 2015, WO.
Extended European Search Report, from EP 14869685.9, dated Apr. 3, 2017, EP.

* cited by examiner

SECURE EXCHANGE FEED MARKET DATA EMBARGO

BACKGROUND

A financial instrument trading system, such as a futures exchange, referred to herein also as an "Exchange", such as the Chicago Mercantile Exchange Inc. (CME), provides a contract market where financial instruments, for example futures and options on futures, are traded. Futures is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

Typically, the Exchange provides for a centralized "clearing house" through which all trades made must be confirmed, matched, and settled each day until offset or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a network. These "electronic" marketplaces are alternative to pit based trading systems whereby the traders, or their representatives, all physically stand in a designated location, i.e. a trading pit, and trade with each other via oral and hand based communication. Anyone standing in or near the trading pit may be privy to the trades taking place, i.e. who is trading, what they are offering to trade (price and quantity), and what ultimately trades. Electronic trading systems attempt to replicate the trading pit environment in a marketplace of electronic form. In doing so, electronic trading systems ideally offer an efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

One manner in which electronic marketplaces attempt to achieve these goals is by separating and restricting the communication of private data, e.g. orders and the responses thereto, from public data, e.g. market data, prices, etc. published to all participants. However, as more traders place more trades, the volume of data being communicated increases as well, increasing the burden on the communication infrastructure and supporting resources that are used to generate and transmit the communications in this manner.

DETAILED DESCRIPTION

Figure 1:
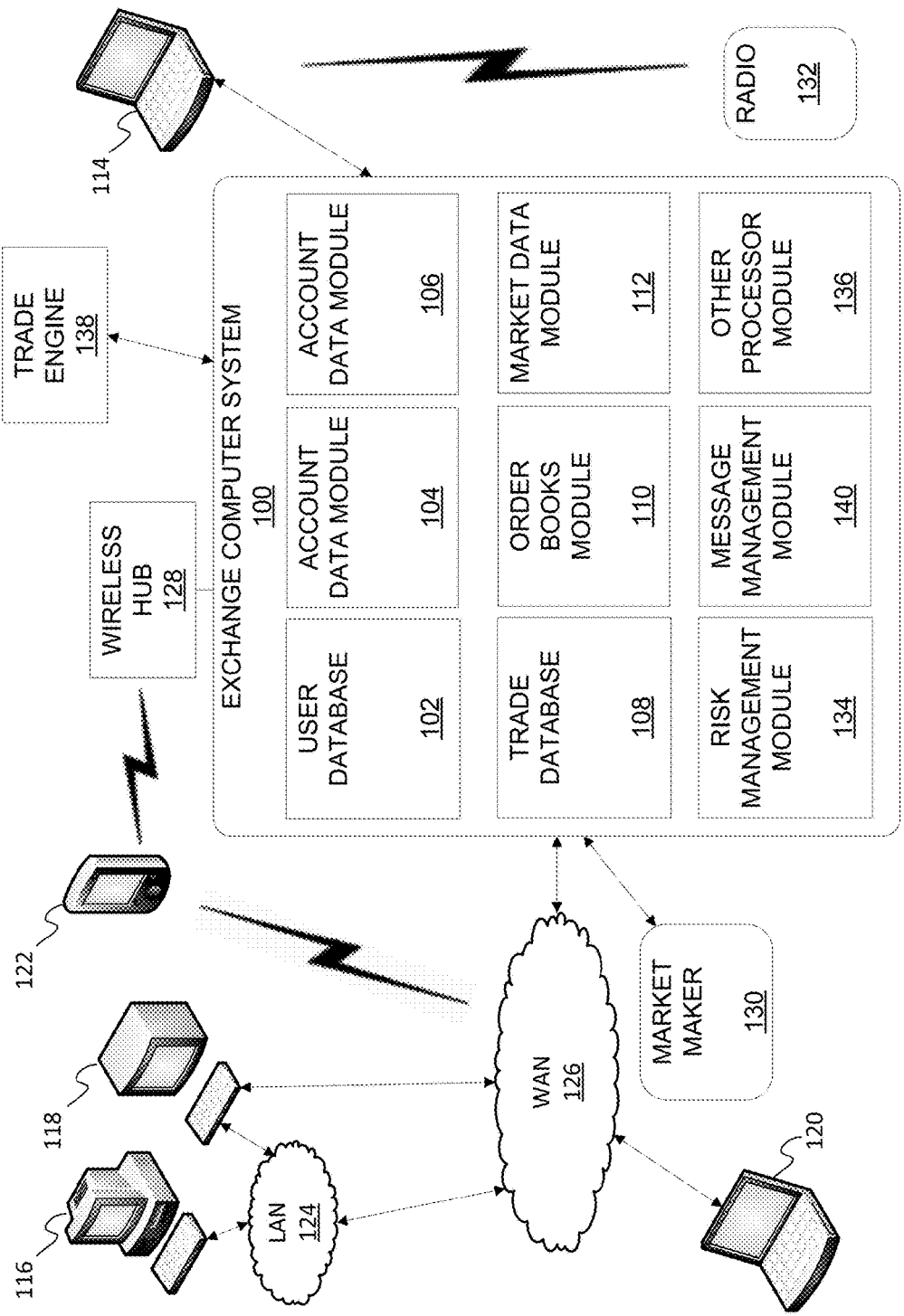
FIG. 1 depicts an illustrative computer network system that may be used to implement aspects of the disclosed embodiments.

By separating private market data message generation and transmission from the generation and transmission of corresponding public market data messages there is the possibility that private data is communicated before, or the transmission thereof otherwise overtakes the transmission of, corresponding public data, thus potentially providing market information to the recipient of the private data prior to other market participants. This prior reception of market information may be an undesirable occurrence due to possible market information imbalances for market participants. The disclosed embodiments relate to communication of financial messages from an Exchange, such as the Chicago Mercantile Exchange ("CME"), to market participants whereby messages directed to particular market participants may be wholly or in part encoded, disguised, or otherwise obfuscated such that private market data contained in the messages is not recognizable by the particular market participant. The obfuscation of the private market data may be designed such that data needed to remove the disguise or otherwise de-obfuscate the data is provided in another message, directed to all market participants, which may further contain data related to the private market data but intended for public dissemination. The particular market participant may receive the data needed to de-obfuscate the private market data from the message directed to all market participants, thus ensuring that the obfuscated private market data cannot be understood by the particular market participant until the message directed to all market participants is received. In this way, the limited possibility of a particular market participant receiving messages with private market data prior to other market participants receiving corresponding public market data is removed, while at the same time, keeping private, highly sensitive data, private.

While the disclosed embodiments may be discussed in relation to trading of futures and/or options on futures, it will be appreciated that the disclosed embodiments may be applicable to any equity, options or futures trading system or market now available or later developed. It will be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancellation, etc., in a manner as expected by the market participants, such as based on market data, e.g. prices, available counter-orders, etc., to provide an expected level of certainty that transactions will occur in a consistent and predictable manner. In addition, it will be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g. that predictable system responses are maintained.

The outbound responses to incoming orders and requests are typically communicated via a medium, e.g. a channel or connection, referred to as a "feed," that is separate from the market information feed which is generally broadcast to all of the market participants.

The disclosed embodiments recognize, however, that the market data messages, e.g. order book updates, are typically responsive to incoming messages from market participants, e.g. price update messages sent in response to trade orders, etc., which may have been received at any prior time. Accordingly, a given market data message broadcast to all market participants in response to an incoming request message may be duplicative of a response message sent specifically to the sender of that request message who is also receiving the broadcasted market data message. For example, a market participant submitting a request, such as a new trade order, order modification, or order cancellation, which impacts the market, e.g. causes a change in price of one or more traded products, may receive confirmation of the processing of their request before the remaining market participants learn of the impact via an update to the market data.

Solutions to scenarios described above include generally reducing the requisite bandwidth of the communications, such as via encoding or compression mechanisms, and introducing mechanisms, such as buffers, to align, equalize or otherwise normalize the latencies of the separate communications paths. However, while reducing the bandwidth required for each of the feeds attempts to address inefficiency, such reductions are system and hardware dependent in their effectiveness. Further, attempts to achieve parity in terms of latency between two different data feeds publishing the same data has generally been a "best effort" solution. That is, while inherent latencies may be accounted for, it is difficult, for example, to account for transient events, such as errors or interference, which may introduce additional and likely substantially random latencies.

As used herein, a financial message refers both to messages communicated by market participants to an electronic trading system and vice versa. Financial messages communicated to the electronic trading system, also referred to as "inbound" messages, may include request messages, such as trader orders, order modifications, order cancellations and the like, as well as other message types. Financial messages communicated from the electronic trading system, referred to as "outbound" messages, may include messages responsive to inbound messages, such as confirmation messages, or other messages such as market update messages, quote messages, and the like.

Financial messages may further be categorized as having or reflecting an impact on a market, also referred to as an "order book" or "book," for a traded product, such as a prevailing price therefore, etc., or not having or reflecting an impact on a market or a subset or portion thereof. For example a request to place a trade may result in a response indicative of the trade either being matched with, or being rested on an order book to await a suitable counter-order. In some cases, requests may elicit a non-impacting response, such as confirmatory response issued temporally proximate to the receipt of the request and then cause a separate market-impact reflecting response at a later time. For example, a stop order, fill or kill order, aka an immediate or cancel order, or other conditional request may not have an immediate market impacting effect, if at all, until the requisite conditions are met. Accordingly, an acknowledgement or confirmation of receipt, e.g. a non-market impacting communication, may be sent to the trader simply confirming that the order was received. Upon the conditions being met and a market impacting result thereof occurring, a market-impacting message may be transmitted as described herein. It will be appreciated that additional conditions may be specified, such as a time or price limit, which may cause the order to be removed or otherwise canceled and that such an event may result in another non-market-impacting communication instead. In some implementations market impacting communications may be communicated separately from non-market impacting communications, such as via a separate communications channel or feed. It will be further appreciated that various types of market data feeds may be provided which reflect different market or aspects thereof. Market participants may then, for example, subscribe to receive those feeds of interest to them. For example, a particular market data feed may only communicate information related to the top buy/sell prices for a particular product, referred to as "top of book" feed. In this case, a request message may be considered market-impacting only if it affects the top buy/sell prices and otherwise is considered non-market-impacting. As market impacting communications tend to be more important to market participants then non impacting communications, this separation may reduce congestion and or noise among those communications having or reflecting an impact on a market or portion thereof. Generally, the disclosed embodiments relate to obfuscating the market data having a market impact reflecting response messages, e.g. responsive to inbound messages, with other market impact reflecting messages as will be described.

Market data feeds may further be characterized as providing a "view" or "overview" of a given market, an aggregation or a portion thereof. For example, a market data feed may convey the entire state of a market for a particular product, e.g. all presently resting buy/sell orders and prices associated therewith as well as trade notifications, etc., only a portion of a market, e.g. only the top 10 resting buy/sell orders, and/or an aggregation of multiple markets or portions thereof. As used herein, a market impacting request may be said to impact the "view" of the market as presented via the market data feed.

Various types of market data feeds may be provided by electronic trading systems, such as the CME, in order to provide different types or subsets of market information or to provide such information in different formats. Examples include Market By Order, Market Depth (aka Market by Price to a designated depth of the book), e.g. CME offers a 10-deep market by price feed, Top of Book (a single depth Market by Price feed), and combinations thereof. There may also be all manner of specialized feeds in terms of the content, i.e. providing, for example, derived data, such as a calculated index). It will be appreciated that number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein.

Generally, the disclosed embodiments create a practical impediment to consuming market information contained in messages sent only to particular market participants. This impediment is based on an obfuscation, or lock, of the market information, and the inability of the particular market participant to remove obfuscation without a corresponding key that is delivered in a public message delivered to all market participants. While the degree to which the obfuscation may be overcome without the corresponding key may vary, in one embodiment the obfuscation need only be sufficient so as to delay any attempts to defeat the obfuscation without the corresponding key for enough time to ensure that other market participants will have the public information before the recipient can defeat the obfuscation. Therefore, any latencies that exist in the system that would cause a private message to arrive at a particular market participant before a public message arrives at all of the market participants would be mitigated by the inability of the particular market participant to consume, use, or understand the market data of the private message upon receipt. Essentially, the embodiments will ensure that private market data will be held in a knowledge embargo until the public message allows for removal thereof.

In one embodiment, obfuscation may be provided through encryption techniques. For example, the market data intended to be disguised may be obfuscated through the use of an encryption algorithm such that the content of the data is incomprehensible to any human or machine without the use of key data configured to decrypt, or make comprehensible, the obfuscated market data. The key data, or encryption key, may be provided separately to control access to the obfuscated, or encrypted, data. For example, the encryption key may be provided with, or as a part of, a public message transmitted by an exchange to participants of a market. A particular market participant that receives the public message may use the encryption key to un-encrypt, or decode, a previously received private message having market data encrypted by an algorithm designed to be decoded by the encryption key.

In an embodiment, private messages with encrypted data will have a particular corresponding encryption key to decode the encrypted data. A particular market participant may determine which public message contains the corresponding encryption key based on an identifier or other correlating indicium that is transmitted with a private message, but not obfuscated. The identifier may identify, or indicate, the public message that contains the corresponding key. For example, the identifier may be a number, and the number matches a number provided with the public message that contains the corresponding key. It will be appreciated that there may be other ways in which the private data message may be correlated with the public data message comprising the key data therefore, and all such methods are contemplated herein.

In one embodiment, unique encryption keys, i.e. dummy or decoy unique keys, may be included with outbound public messages so as to further normalize the format and/or appearance of public messages. In this way, all messages may be presented with a similar appearance to the market participants, and it may be more difficult to infer market information from the mere existence of an encryption key in a public message. Also, multiple encryption keys, dummy keys, or combinations thereof may be provided with a public message. For example, multiple encryption keys may be included with a public message that discloses information reflected in multiple private messages. Multiple dummy keys may then be required to normalize the appearance of public messages that do not have multiple encryption keys included. Also, random numbers of dummy keys may be generated and included with messages to further obscure the existence or intent of the actual encryption keys.

In an embodiment, a device may be provided for a market participant. The device may be operable to receive a private message having obfuscated data. The device may also be operable to receive a public message having key data configured to remove the obfuscation from the obfuscated data of the private message.

In accordance with aspects of the disclosure, systems and methods are disclosed for managing communication of financial messages. The disclosed embodiments are preferably implemented with computer devices and computer networks, such as those described with respect to FIG. 4, that allow users, e.g. market participants, to exchange trading information. It will be appreciated that the plurality of entities utilizing the disclosed embodiments, e.g. the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

Figure 5:
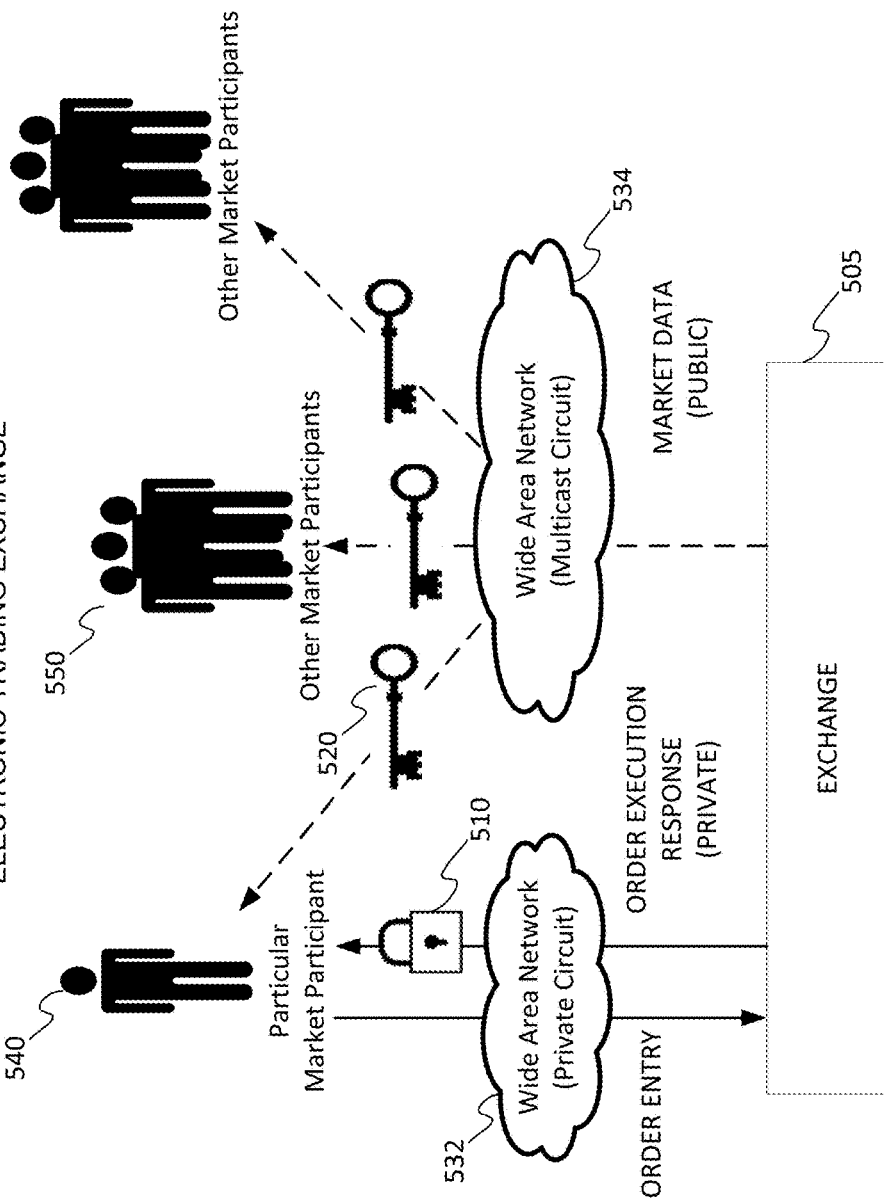
FIG. 5 depicts a diagram for managing the communication of market data with financial messages.

A diagram for managing the communication of market data over networks 532 and 534 to a plurality of market participants 550 and 540 with financial messages 510 and 530 is shown in FIG. 5. For example, a particular market participant 540 may place an order with an exchange 505 using a network 532. The exchange 505 may respond to the order by sending a private message 510 over the private circuit network 532 to the particular market participant 540. The private message 510 is locked or obfuscated in a manner that does not allow the particular market participant 540 to know the content of the private message 510. The exchange 505 may also generate a public message 520 and send it using a multicast circuit network 534. In an embodiment, the multicast circuit network 534 may be considered a public network. In another embodiment, the multicast circuit network 534 may be a collection of private circuit networks for a plurality of market participants 540. A key designed to unlock the content of the private message 510 may be included with the public message 520. When the public message 520 is transmitted using the multicast network 534, both the particular market participant 540 and the other market participants 550 may receive the public message 520. The particular market participant will then be able to use the key in the public message 520 to unlock the content of the private message 510.

An exemplary trading network environment for implementing trading systems and methods is shown in FIG. 1. An exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A message management module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

In an embodiment, the message management module 140 may include a message generator configured to generate a first message with at least a portion of the first message obfuscated such that the obfuscated portion of the first message is incomprehensible without associated key data configured to make the obfuscated portion comprehensible, and generate the second message comprising the associated key data. The message management module 140 may also involve a message transmitter configured to transmit the first message to a first market participant and the second message to a plurality of market participants.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user and transmitting that order information to exchange computer system 100. In another example, the exemplary computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the Exchange computer system 100 further includes a message management module 140 which may implement, in conjunction with the market data module 112, the disclosed mechanisms for managing market messages containing financial data sent between an exchange and a plurality of market participants. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 2:
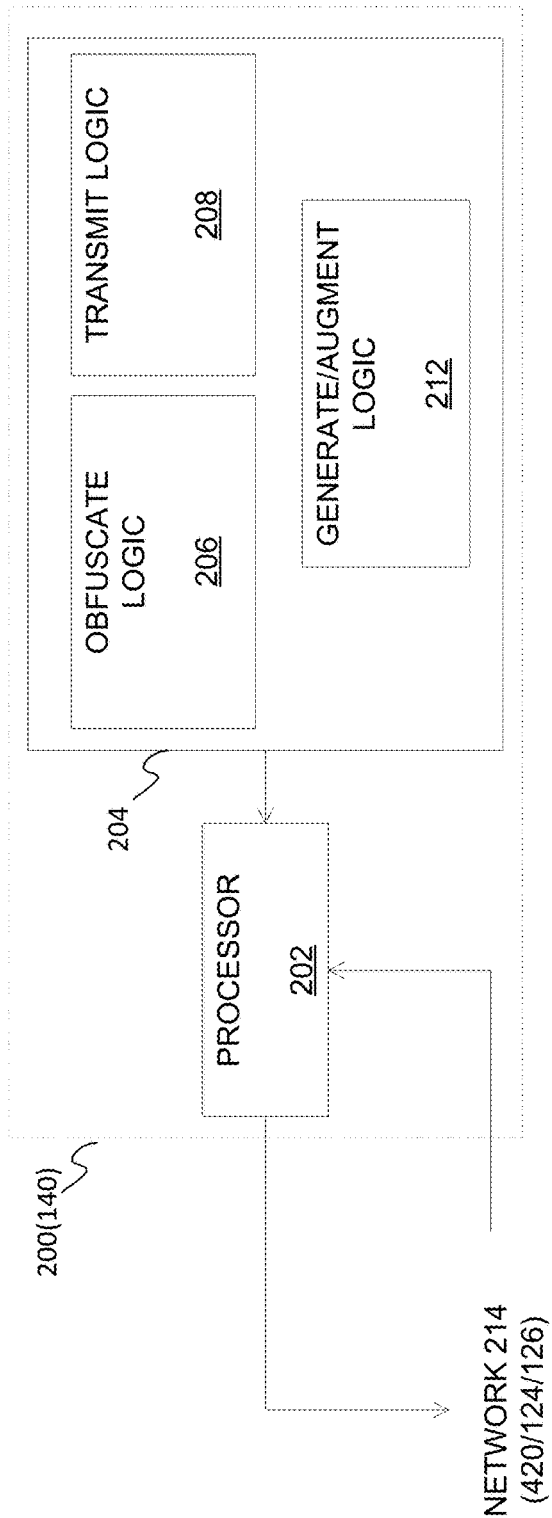
FIG. 2 depicts a block diagram of a message management module and a message receipt device for use in the system of FIG. 1.

FIG. 2 depicts a block diagram of a message management module 140 according to one embodiment, which in an exemplary implementation, is implemented as part of the exchange computer system 100 described above.

The embodiments described herein utilize trade related messages such as mass quote messages, individual order messages, cancellation messages, etc. The trading entity may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

FIG. 2 shows a system 200 for management of communication of a plurality of financial messages to a plurality of market participants via a network 214 which, as described above, may be the network 420 described below or network 124 or 126 described above, which may be implemented as a consolidated feed module 140 as described above. The plurality of messages may include a first financial message including data intended to be received and comprehended by a first market participant of a plurality of market participants, and a second financial message corresponding to the first financial message, and including data intended for all of the plurality of market participants. It will be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g. the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entirety. Further, the disclosed message management system may be implemented using an open message standard implementation, such as FIX or FIX/FAST, or by an Exchange-provided API.

The system 200 includes a processor 202 and a memory 204 coupled therewith which may be implemented as processor 402 and memory 404 as described below with respect to FIG. 4. The system 200 further includes first logic 206 stored in the memory 204 and executable by the processor 202 to cause the processor 202 to obfuscate at least a portion of a first financial message such that the obfuscated portion of the first financial message is incomprehensible to the first market participant without associated key data configured to make the obfuscated portion comprehensible to the first market participant. The system 200 also includes a second logic 212 stored in the memory 204 and executable by the processor 202 to generate a second financial message comprising the associated key data. Alternatively, the second logic 212 may be configured to augment an existing second message with the associated key data. The system 200 further includes a third logic 208 stored in the memory 204 and executable by the processor 202 to cause the processor 202 to transmit, via the network 214, the obfuscated first financial message to a first market participant. The system 200 additionally includes a fourth logic 208 stored in the memory 204 and executable by the processor 202 to cause the processor 202 to transmit, via the network 214, the second financial message to a plurality of market participants. The first financial message may be in response to a trade order, trade modification, trade cancellation, or combination thereof and comprise a confirmation message, update message, rejection message, or combination thereof. The first financial message may be generated by the system 200 in response to a previous message submitted by the first market participant.

In one embodiment, the first logic 206 may be executable by the processor 202 to obfuscate at least a portion of the first financial message by transforming readable plain text into unreadable ciphertext using an encryption algorithm. The encryption algorithm may be a symmetric key algorithm, asymmetric algorithm, or any encryption algorithm configured to sufficiently obfuscate the portion of the first financial message such that a brute force deciphering attempt would take at least a length of time determined to be the delay between a receipt of a first financial message by a particular market participant and a receipt of a second financial message by at least one market participant of a plurality of the market participants. The first logic 206 may be further executable to generate key data in the form of an encryption cypher configured to make an obfuscated portion of a first message comprehensible to a first market participant. As an alternative, the second logic 212 may be further executable to generate the key data. The second logic 212 may also be executable to include an identifier with key data. The identifier may indicate an association between a first financial message having an obfuscated portion and key data configured to decode, or make understandable, the obfuscated portion.

In one embodiment, the second logic 212 may be further executable by the processor 202 to augment a second financial message with identification data recognizable by a first market participant to associate the decode key in the second financial message with a first financial message received by the first market participant. For example, the identification data may be an identification number that matches a number included in an un-obfuscated, or comprehensible, portion of the first message. In another embodiment, the identification data may be recognizable.

In one embodiment, the second logic 212 is further executable by the processor 202 to augment a financial message with data indicating key data associated with multiple messages. For example, dummy keys, or key data not operational to decode specific data, may be included in a financial message. Dummy keys may be used to indicate the appearance of normality for financial messages that do not include key data. Also, if in an embodiment multiple sets of key data are included in a financial message to decode multiple portions of multiple messages, including multiple dummy keys such that a standard number of keys, or amount of key data, is maintained, may provide a normal appearance to a market participant.

In one embodiment, system 200 may include a fifth logic executable by the processor 202 to generate a third message having a dummy key not functional to decode any message or portions of any message. Typically, a third message would be a public financial message, intended for receipt by a plurality of market participants. This may be an additional technique to maintain a common appearance for all public messages of a messaging system.

Figure 6:
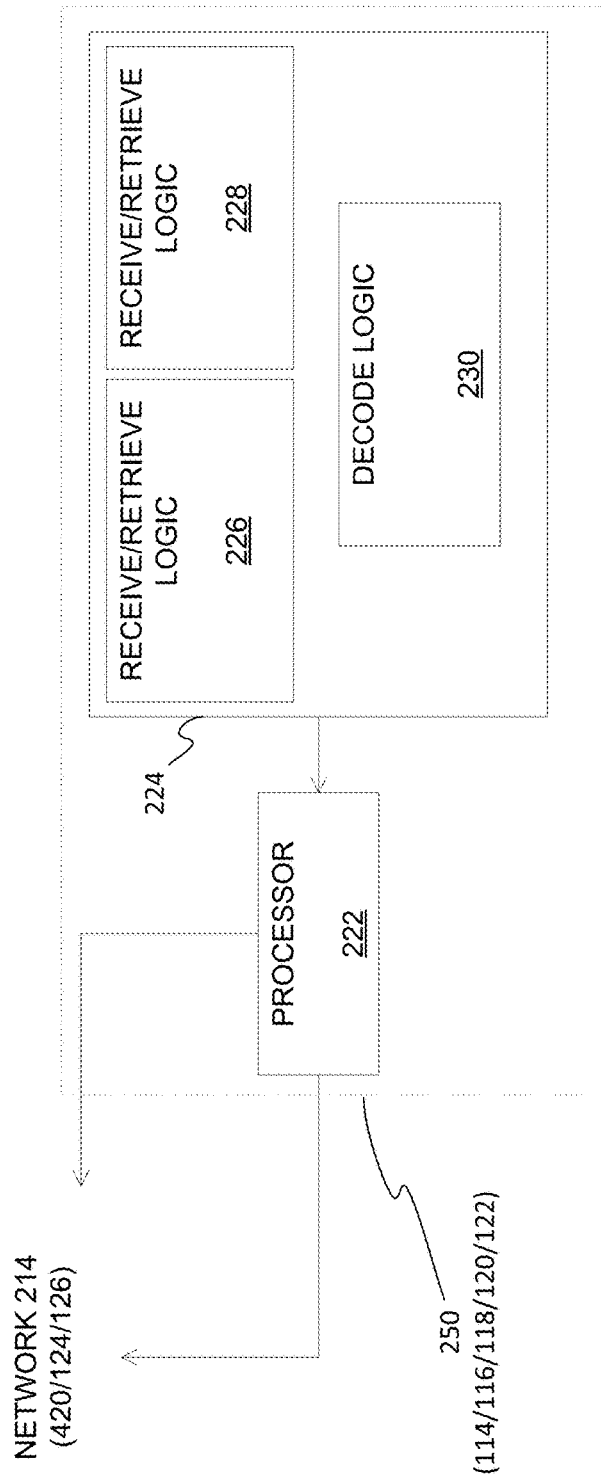
FIG. 6 depicts a message receipt device or system for use with the communication of financial messages.

FIG. 6 shows an embodiment of a message receipt device 250 which may be utilized in conjunction with the previously described embodiments and which may be implemented as a computer device 114, 116, 118, 120, or 122 of FIG. 1. The message receipt device 250 includes a processor 222 and a memory 224 coupled therewith which may be implemented a processor 402 and memory 404 as described below with respect to FIG. 4. The message receipt device 250 further includes a first logic 226 stored in the memory 224 and configured to be executed by the processor 222 to cause the processor 222 to receive a first message, such as was described above, that includes market data, at least a portion of which is obfuscated such that it is indecipherable without an associated key, or key data, configured to decipher the first message.

Alternatively, the first logic 226 may be configured to cause the processor 222 to retrieve the first message from the system 200 using the network 214. The message receipt device 250 also includes a second logic 228 stored in the memory 224 and configured to be executed by the processor 222 to cause the processor 222 to retrieve a second message transmitted to a plurality of market participants by the system 200 via the network 214. The second message comprising market data and the associated key, or key data, configured to decipher the obfuscated market data of the first message. The message receipt device 250 also includes a third logic 230 stored in the memory 224 and configured to be executed by the processor 222 to cause the processor 222 to decipher the obfuscated market data of the first message using the associated key, or key data.

Figure 3:
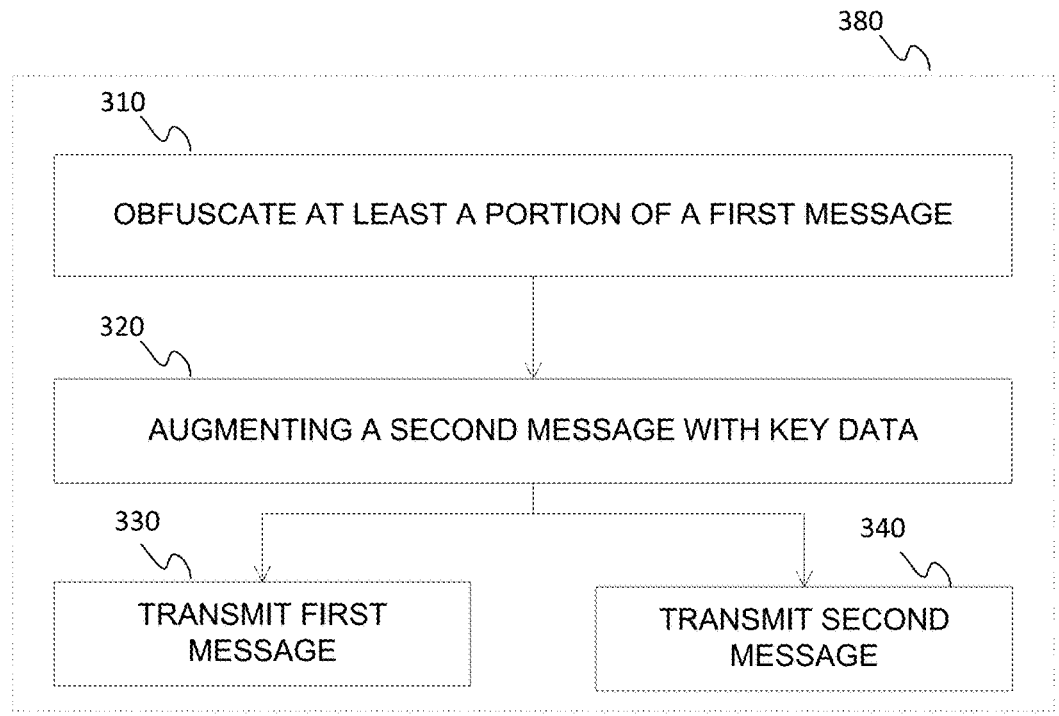
FIG. 3 depicts a flow chart for managing the communication of financial messages, that may be implemented using the system of FIGS. 1 and 2.

FIG. 3 depicts a flow chart showing operation of the system 200 of FIG. 2. In particular FIG. 3 shows a computer implemented method for managing communication of a plurality of financial messages to a plurality of market participants via a network 214 wherein the plurality of financial messages includes a first financial message. The first financial message includes first market data intended to be received and comprehended by a first market participant of the plurality of market participants. The plurality of financial messages also includes a second financial message, corresponding to the first financial message, and including second market data intended to be received and comprehended by all of the plurality of market participants. The operation includes obfuscating at least a portion of a first message (Block 310), augmenting a second message with key data (Block 320), transmitting the first message (Block 330), and transmitting the second message (Block 340).

In an embodiment, the first financial message and the second financial message are considered a message pair and are generated in response to the same market activity. For example, the first financial message may be an order confirmation sent to the first market participant, and the second financial message may be a market price adjustment of an underlying good or object as a result of the order.

An embodiment involves obfuscating (Block 310), by the processor 202, at least a portion of the first market data of the first financial message such that the obfuscated portion of the first market data is incomprehensible to the first market participant without associated key data configured to render the obfuscated data comprehensible to the first market participant. The first financial message be a confirmation message, update message, rejection message, or combination thereof. The obfuscating may be by any method operational to obscure the understanding of the portion of the first market data. In an embodiment, the obfuscating (Block 310) involves transforming readable plain text into unreadable ciphertext using an encryption algorithm. Also, the associated key data may include an encryption cypher sized to resist a brute force deciphering attempt for a length of time determined to be the delay between a receipt of the first financial message and receipt of the second financial message by the particular first market participant. Obfuscating may involve any process or method that renders data incomprehensible to humans and machines without the application of the associated key data.

In an embodiment, all of the first financial message may be obfuscated. In another embodiment, all of any market data included in the first message may be obfuscated, and other data included in the first market message may be comprehensible. In an embodiment, all the market data of a financial message may be obfuscated, but a portion of the message indicating identification data for a second financial message is not obfuscated. For example, the first financial message may include a comprehensible identifier and obfuscated market data. The identifier may identify the second market message having key data configured to un-obfuscate, or make comprehensible, the first financial message market data. In an embodiment the identifier in the first message may match an identifier in the second message. In another embodiment, the identifier in the first financial message may correspond to data in a second financial message, but not match the data in the second financial message. In an embodiment, the first message identifier may indicate a category and/or classification directing the first market participant to the corresponding second financial message. For example, if market message feeds are assigned a color, the first financial message identifier may indicate the color and an individual message sequence number for the feed. In such an embodiment, the first message identifier may read "RED002341" thus indicating that message number 002341 of the "RED" feed is the corresponding second financial message containing the associated key data.

In an embodiment, the first financial message may be responsive to a message previously received from the first market participant. For example, the first market participant may have submitted an order, and the first financial message may be an order confirmation to confirm that the order has been placed. Further, in such an embodiment, the data of the first market message indicating what order is being confirmed may be obfuscated. In another embodiment, all substantive market data may be obfuscated. For example, the market data indicating the type of message, i.e. order confirmation, the corresponding order, the underlying object of the order, the volume of the order, and any other information that may indicate a potential effect to the market is obfuscated. In other embodiments, only selected types of market data are obfuscated. For example, only the underlying object and volume of the order may be obfuscated.

An embodiment involves augmenting (Block 320), by the processor 202, the second financial message corresponding to the first financial message, with the associated key data. The key data may be an encryption cypher operable to decipher market data or messages encrypted with a corresponding encryption algorithm.

In an embodiment, augmenting, by the processor 202, the second financial message further involves augmenting the second financial message to include identification data linking the associated key data in the second financial message with the first financial message. For example, the second financial message may be augmented with an identifier that matches an identifier of the first financial message.

In an embodiment, the second financial message may be augmented with data indicating the existence of a plurality of keys, or associated key data for multiple financial messages. For example, a public message, in this embodiment a second message, may involve market data related to multiple private messages, one of which may be the first message. As multiple private messages may be partially or wholly obfuscated, the public message may include, or be augmented with, multiple keys configured to provide key data associated with the obfuscated private messages. In an embodiment, the second financial message may also be augmented with dummy keys, or data resembling key data but not configured to render obfuscated data comprehensible. Dummy keys may be used to normalize the appearance of the second financial message in an embodiment involving multiple key augmentation. In another embodiment, a third financial message that may not have a corresponding private message, or may not otherwise contain key data, may be augmented with a dummy key, or dummy key data. The third message may also be transmitted to a plurality of market participants.

An embodiment involves transmitting (Block 330), by the processor 202 via the network 214, the obfuscated first financial message to the first market participant.

An embodiment involves transmitting (Block 340), by the processor 202 via the network 214, the second financial message to the plurality of market participants.

Figure 7:
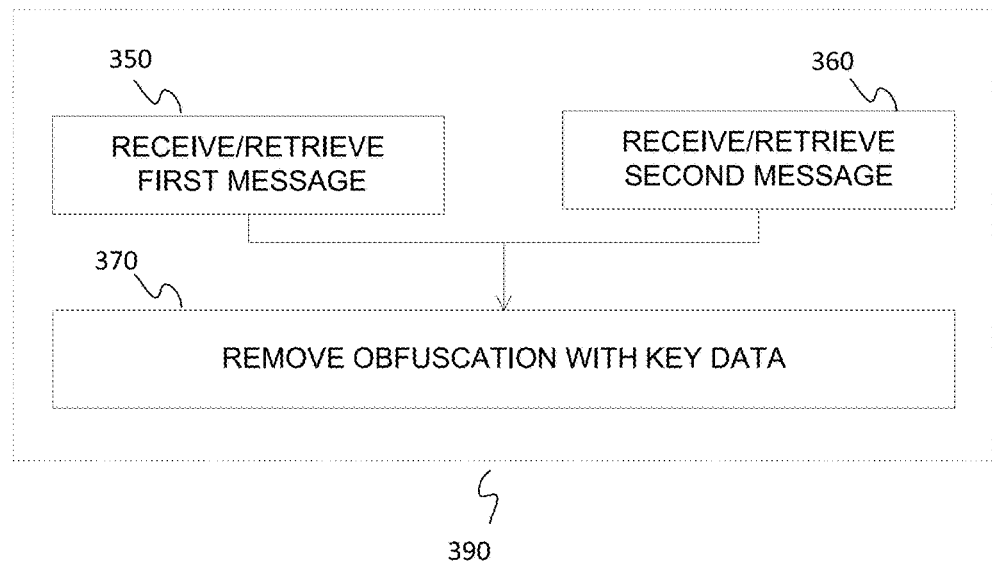
FIG. 7 depicts a flow chart for the communication of financial messages that may be implemented using the system of FIGS. 1 and 6.

FIG. 7 depicts a flow chart showing operation of the message receipt device 250 of FIG. 6. The operation may include receiving the first message (Block 350), receiving the second message (Block 360), and removing the obfuscation of data in the first message with key data contained in the second message (Block 370).

An embodiment involves receiving (Block 350) the first financial message from system 200 using the network 214. The first financial message comprising market data. at least a portion of which is obfuscated such that the obfuscated portion of the first market data is incomprehensible without associated key data configured to decode, or render comprehensible, the obfuscated data.

An embodiment involves retrieving (Block 360) the second message transmitted to a plurality of market participants the first financial message from system 200 using the network 214. The second message comprising the associated key data configured to decode, or render comprehensible, the obfuscated market data of first message.

An embodiment involves removing (Block 370) the obfuscation of the obfuscated market data of the first financial message using the key data from the second financial message. Removing the obfuscation may involve decoding, deciphering, un-encrypting, or any other method of rendering the obfuscated market data comprehensible.

It will be understood that at least a portion of the flow chart of FIG. 3 (collection of blocks 380) may be implemented using the system 200 of FIG. 2, and at least a portion of FIG. 7 (collection of blocks 390) may be implemented using the message retrieval device 250 of FIG. 6. One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

Figure 4:
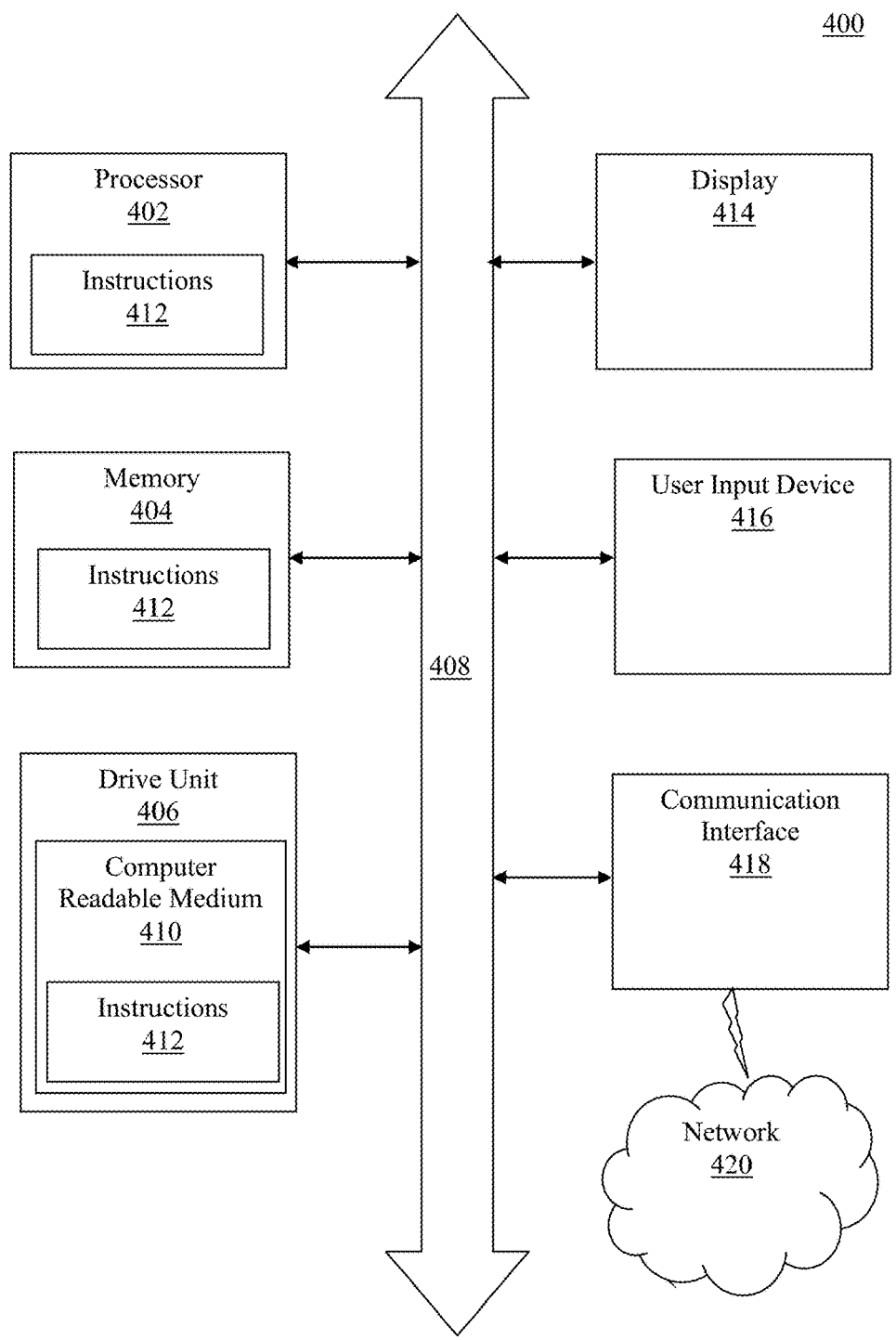
FIG. 4 shows an illustrative embodiment of a general computer system for use with the system of FIG. 1.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above, such as the processor 202, may be a computer system 400 or a component in the computer system 400. The computer system 400 may implement a match engine, margin processing, payment or clearing function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for managing communication of a plurality of financial messages to a plurality of market participants via a network, wherein each of the plurality of financial messages may be subject to varying transmission delays while being communicated to any of the plurality of market participants, the method comprising:

obfuscating, by a processor, at least a portion of first market data included in a first financial message of the plurality of financial messages, the first financial message to be transmitted to a first market participant of the plurality of market participants, such that the obfuscated portion of the first market data is incomprehensible to the first market participant without associated key data configured to render the obfuscated data comprehensible thereto, the first market data intended to be received and comprehended by the first market participant, and wherein the plurality of financial messages further includes a second financial message corresponding to the first financial message and including second market data intended to be received and comprehended by all of the plurality of market participants, wherein the obfuscating comprises transforming readable plain text into unreadable ciphertext using an encryption algorithm and wherein the associated key data comprises an encryption cypher sized to resist a brute force deciphering attempt for a length of time determined to be the delay between a receipt of the first financial message and receipt of the second financial message by at least one of the plurality of market participants;

augmenting, by the processor, the second financial message corresponding to the first financial message, with the associated key data; and transmitting, by the processor via the network, the obfuscated first financial message to the first market participant and the second financial message to the plurality of market participants such that regardless of whether the first financial message experiences a different transmission delay while being communicated via the network than a transmission delay experienced by the second financial message and arrives at the first market participant before the second financial message, the first market participant is unable to access the obfuscated portion of the first financial message prior to receipt of the second financial message.

2. The computer implemented method of claim 1, wherein all of the market data of the first financial message is obfuscated.

3. The computer implemented method of claim 1, wherein the first financial message is responsive to a message previously received from the first market participant.

4. The computer implemented method of claim 1, wherein the augmenting of the second financial message further comprises augmenting the second financial message to include identification data linking the associated key data in the second financial message with the first financial message.

5. The computer implemented method of claim 1, wherein a portion of the first financial message is not obfuscated and comprises data that indicates identification data contained in the second financial message.

6. The computer implemented method of claim 1, wherein the associated key data comprises an identifier indicating an association with the first financial message.

7. The computer implemented method of claim 6, wherein the second financial message further comprises data indicating a plurality of keys.

8. The computer implemented method of claim 1, wherein the first financial message comprises a confirmation message, update message, rejection message, or combination thereof.

9. The computer implemented method of claim 1, further comprised of generating a third message comprising at least one dummy key not configured to render obfuscated data comprehensible, and transmitting the third message to the plurality of market participants.

10. The computer implemented method of claim 1, wherein the first financial message and the second financial message are a message pair generated in response to a same market activity.

11. A system for managing communication of a plurality of financial messages to a plurality of market participants via a network wherein each of the plurality of financial messages may be subject to varying transmission delays while being communicated to any of the plurality of market participants, the system comprising:

a first logic stored in a memory and configured to be executed by a processor to cause the processor to obfuscate at least a portion of a first financial message of the plurality of financial messages, the first financial message to be transmitted to a first market participant of the plurality of market participants, such that the obfuscated portion of the first financial message is incomprehensible without associated key data configured to make the obfuscated portion comprehensible to the first market participant, the portion of the first financial message intended to be received and comprehended by the first market participant, and wherein the plurality of financial messages further includes a second financial message corresponding to the first financial message and including second data intended to be received and comprehended by all of the plurality of market participants, wherein the first logic is further configured to obfuscate at least the portion of the first financial message by transforming readable plain text into unreadable ciphertext using an encryption algorithm and wherein the associated key data is an encryption cypher sized to resist a brute force deciphering attempt for a length of time determined to be the delay between a receipt of the first financial message by the particular market participant and the receipt of the second financial message by at least one market participant of the plurality of the market participants;

a second logic stored in the memory and configured to be executed by a processor to cause the processor to generate the second financial message comprising the associated key data;

a third logic stored in a memory and configured to be executed by a processor to cause the processor to transmit, via a network, the first financial message to the first market participant; and a fourth logic stored in the memory and configured to be executed by a processor to cause the processor to transmit, via the network, the second financial message to the plurality of market participants; and wherein regardless of whether the first financial message experiences a different transmission delay while being communicated via the network than a transmission delay experienced by the second financial message and arrives at the first market participant before the second financial message, the first market participant is unable to access the obfuscated portion of the first financial message prior to receipt of the second financial message.

12. The system of claim 11, wherein the encryption algorithm is a symmetric-key algorithm or an asymmetric-key algorithm.

13. The system of claim 11, wherein the second logic configured to generate the second financial message comprises augmenting the second financial message with identification data recognizable by the first market participant to associate the decode key in the second financial message with the first financial message.

14. The system of claim 11, wherein the associated decode key comprises an identifier indicating an association with the first financial message.

15. The system of claim 14, wherein the second financial message further comprises data indicating a plurality of decode keys.

16. The system of claim 11, wherein the first financial message comprises a confirmation message, update message, rejection message, or combination thereof.

17. The system of claim 11, further comprising a fifth logic stored in the memory and configured to be executed by a processor to generate a third message comprising a dummy key not functional to decode a message.

18. The system of claim 11, wherein the first financial message is generated responsive to a previous message submitted by the first market participant.

19. A system for generating a plurality of messages to a plurality of market participants for communication thereto via a network wherein each of the plurality of financial messages may be subject to varying transmission delays while being communicated to any of the plurality of market participants, the system comprising a computer processor coupled with the network, the system further comprising:

a message generator implemented by the computer processor and configured to generate a first message of the plurality of financial messages, the first message to be transmitted to a first market participant of the plurality of market participants for comprehension thereby, with at least a portion of the first message obfuscated such that the obfuscated portion of the first message is incomprehensible without associated key data configured to make the obfuscated portion comprehensible to the first market participant, and generate a second message corresponding to the first message and including second data intended to be received and comprehended by all of the plurality of market participants, the second message further comprising the associated key data, wherein the obfuscated portion comprises readable plain text transformed into unreadable ciphertext using an encryption algorithm and wherein the associated key data comprises an encryption cypher sized to resist a brute force deciphering attempt for a length of time determined to be the delay between a receipt of the first financial message and receipt of the second financial message by at least one of the plurality of market participants; and a message transmitter implemented by the computer processor and configured to transmit the first message to the first market participant and the second message to the plurality of market participants such that regardless of whether the first message experiences a different transmission delay while being communicated via the network than a transmission delay experienced by the second message and arrives at the first market participant before the second message, the first market participant is unable to access the obfuscated portion of the first message prior to receipt of the second message.

* * * * *